INVENTORS
HARRY A. BARBER
JAMES F. SAUER
BY
ATTORNEYS

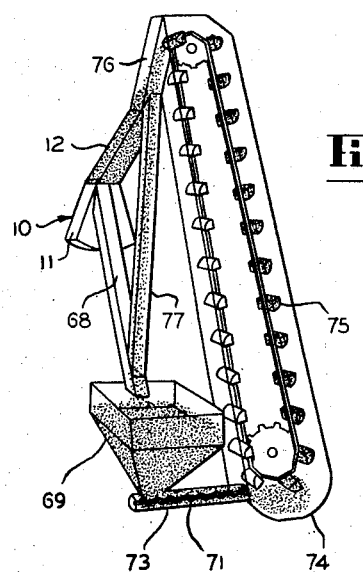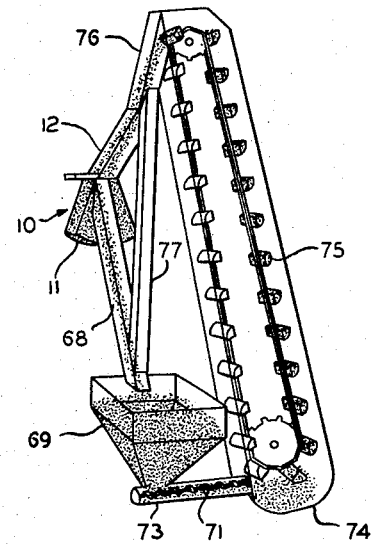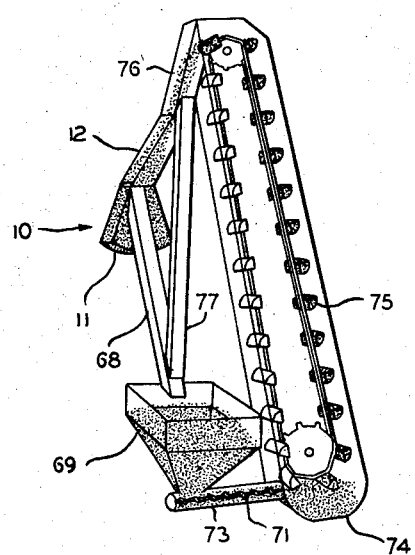

United States Patent Office 2,893,600
Patented July 7, 1959

2,893,600

SYSTEM AND APPARATUS FOR MEASURING LOOSE MATERIAL

Harry A. Barber and James F. Sauer, Aurora, Ill., assignors to Barber-Greene Company, Aurora, Ill., a corporation of Illinois Application September 9, 1955, Serial No. 533,285

3 Claims. (Cl. 222—1)

This invention relates to an improved system and apparatus particularly adapted to supply and measure loose material for mixture with asphalt and the like.

A principal object of the invention is to provide a simplified and improved method and apparatus for measuring and supplying loose material for mixture with asphalt and the like in a simpler and more expeditious manner than formerly.

Another object of the invention is to provide a novel and improved measuring system and apparatus for measuring a predetermined weight of fine loose material from a flowing stream of loose material by determining the volume of the material necessary for a predetermined weight and overflowing the material to the required volume.

Another object of the invention is to provide a simplified form of measuring system and apparatus for loose material, such as mineral fines for mixture with asphalt and aggregate in which a flow of loose material is maintained and the loose material is first measured by weighing a first batch, and is measured for the next succeeding batches by providing a greater volume of loose material than necessary to fill the measuring bin and by overflowing the measuring bin.

In carrying out our invention we provide a variable volume measuring bin arranged for weighing a first batch of loose material, such as mineral fines, and having a movable wall for adjusting the volume thereof in accordance with a predetermined weight of fines for mixture with aggregate and asphalt, and provide a conveyor and storage chute for filling the measuring bin together with means for stopping the flow of fines from the storage chute to the measuring bin and also provide a diverting chute for the fines elevated by the conveyor and measure the fines by an overflow chute for the measuring bin accommodating the fines to overflow at a uniform level for each measuring operation, all during operation of the elevating conveyor.

These and other objects of our invention will appear from time to time as the following specification proceeds and with reference to accompanying drawings wherein:

Figures 2, 3 and 4 are diagrammatic views illustrating the apparatus and system of our invention.

Figure 1:
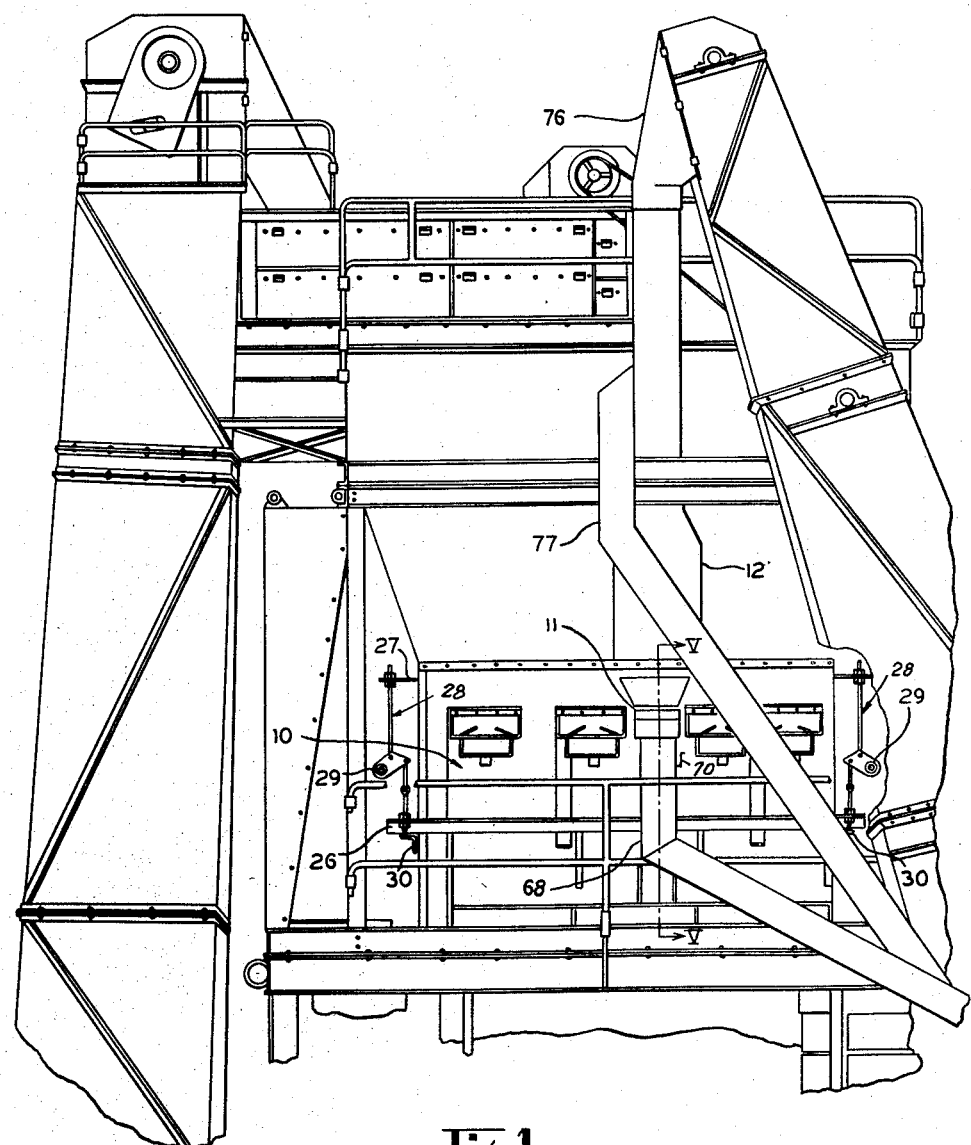
Figure 1 is a fragmentary view in side elevation of an asphalt batch plant constructed in accordance with our invention.

In the embodiment of our invention illustrated in the drawings, we have shown in Figure 1 a fragmentary view in side elevation of an asphalt batch plant having a measuring apparatus and system constructed in accordance with our invention embodied therein, in which a weigh hopper 10 is divided into a plurality of compartments forming measuring bins for various sizes of aggregates for mixture with asphalt, and also forming a mineral fines measuring bin 11 for measuring the mineral fines and discharging a measured weight or volume of mineral fines for mixture with asphalt and the aggregate carried in the weigh hopper, as in our joint application with Roy C. Heacock Serial No. 533,284, filed September 9, 1956, so only shown and described herein insofar as is necessary to make the present invention readily understandable.

It should here be understood that while the measuring bin 11 measures mineral fines, that it may also measure aggregate or any other loose material and that the measuring system of our invention is adaptable to measure various kinds of loose material.

The weigh hopper 10 is shown as being generally triangular in transverse section with the apex of the triangle at the top thereof and arranged in material receiving relation with the respect to a supply chute 12, supported thereabove. The supply chute 12 has a restricted rectangular discharge end 13 for feeding mineral fines into the measuring bin 11 of the weigh hopper 10 under the control of a sliding gate 15, slidably guided for movement along the discharge end portion 13 of the weigh hopper. The sliding gate 15 has an open portion 16 movable in communication with the discharge end portion 13 of the supply chute 12 and forming a conduit for feeding mineral fines from the supply chute 12 to the measuring bin 11. The sliding gate 15 also has a closure plate 17 disposed rearwardly of the open portion 16 thereof and movable beneath the discharge end portion 13 of the supply chute 12, to block the feeding of material into the measuring bin 11 from said supply chute.

A double acting cylinder 19 having a piston rod 20 extensible therefrom is provided to operate the sliding gate 15. As herein shown, the cylinder 19 is supported at its head end on a support bracket 22 and channel 23 extending along the weigh hopper and braced from an inclined wall 24 of a supply bin for aggregate, by a brace 25 extending rearwardly and downwardly from the wall 24.

The weight hopper 10 may be like that shown in our aforementioned joint application with Roy C. Heacock and is supported on parallel spaced beams 26 suspended at opposite ends thereof on parallel spaced beams 27 through suspension linkage connections 28 including parallel torsion bars 29 having operative connection with a scale (not shown). The scale and the suspension connection of the beams 26 to the scale levers are no part of our present invention and may be of various well known forms, so need not herein be shown or described further.

Two support beams 30 extend across opposite ends of the weigh hopper 10 and are movable into engagement with the beams 26 to take the weight of the weigh hopper from the scale after an initial batch has been weighed and it is desired to volumetrically measure the next succeeding batches, as will hereinafter more clearly appear as this specification proceeds.

The beams 30 are shown as extending beneath the beams 26 and are suspended from the beams 27 by adjustable linkages (not shown), adjustable in length to bring the beams 30 up into engagement with the beams 26 to support the weigh hopper free from the scale as in our joint application with Roy C. Heacock.

Figure 5:
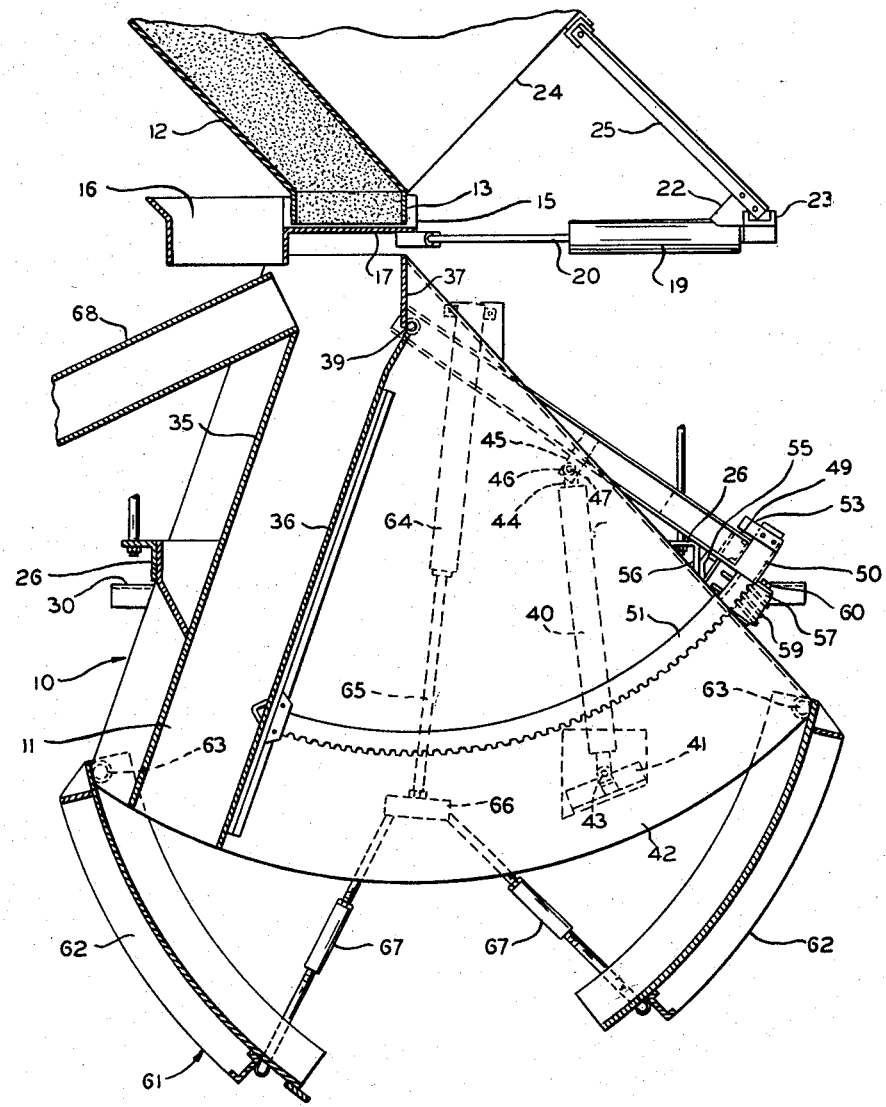
Figure 5 is a transverse sectional view taken through the weigh hopper and measuring bin substantially along line V—V of Figure 1.

The measuring bin 11 of the weigh hopper 10 is shown in Figure 5 as having an inclined side wall 35 extending along one side thereof and an opposite pivoted side wall 36 interleaving a depending wall 37 at the receiving end of the bin and pivotally connected thereto on a hinge pin 39. The wall 36 is moved to a wide open position by means of cylinders 40 pivotally carried at each end of the weigh hopper 10, on brackets 41, connected to end walls 42 of the hopper. The cylinders 40 are pivotally supported on the brackets 41 on pivot pins 43. Piston rods 44 extensible from the cylinders 40 are shown as extending between the end portions of straps 45 extending about and depending from pivoted actuating arms 46 for the pivoted side wall 39. Said piston rods are pivotally connected to said straps by pivot pins 47.

The actuating arms 46 are connected together by a connecting arm 49 having a strap 50 secured thereto and extending rearwardly therefrom. The strap 50 has slidable engagement with an arcuate rack 51. The arcuate rack 51 is secured to the pivoted wall 36 adjacent the lower end thereof, and has a stop 53 at its outer end engaged by the arm 49, upon upward pivotal movement thereof, to swing the pivoted side wall 36 about the axis of the hinge pin 39 in an opening direction. A stop 55 is adjustably carried on the rack 51 and abuts a depending leg 56 of the beam or angle 26 extending along the side of the weigh hopper 10 adjacent the pivoted side wall 36, to limit closing movement of said pivoted side wall. The stop 55 includes a worm housing 57 having a worm 59 journaled therein and meshing with the teeth of the rack 51. The worm may be rotated by a crank or the like (not shown) engageable with a squared end of a shaft 60 for said worm. Turning movement of the worm 59 thus varies the position of the stop 55 along the rack 51 and manually opens the pivoted side wall 36 to a required volumetric capacity of the bin 11, for a predetermined weigh of mineral fines as in our forementioned joint application with Roy C. Heacock.

The weigh hopper 10 is also provided with a clam shell drop bottom 61 including gates 62 pivoted to opposite sides of said weigh hopper, as by pivot pins 63. The gates 62 are operated by fluid pressure cylinders 64, one of which is secured to each wall of the hopper 10. The cylinders 64 have piston rods 65 extensible therefrom. Each piston rod 65 is connected to a pair of gates 62 through a yoke 66 secured to the lower end thereof. Links 67, pivotally connected to opposite ends of said yoke, connect said piston rods to the inner ends of the gates 62. Thus upon the admission of fluid under pressure to the piston rod ends of the cylinders 64, the gates 62 will be pivoted into a closed position to retain mineral fines in the bin 11. Upon the admission of fluid under pressure of head ends of said cylinders the gates 62 will drop for the discharge of mineral fines from the bottom of said weigh hopper, as in our forementioned joint application with Roy C. Heacock.

The wall 35 of the weigh hopper 10 is also shown as having an inclined overflow chute 68 extending downwardly and outwardly therefrom from the top thereof for carrying the excess fines back to a storage bin 69 when the sliding gate 15 is closed and the measuring bin 11 has been filled, and thus assuring a uniform volume of fines in the measuring bin 11 for mixture with each batch of asphalt and aggregate.

The overflow chute 68 has a limit switch (not shown) associated therewith and operated by a pivoted switch arm 70 on the outside of said chute. The switch arm 70 may be actuated by a pivoted vane (not shown) on the inside of said overflow chute. The vane within the overflow chute 68 is moved by the flow of material along said chute to actuate the switch arm 70 to close the limit switch and effect operation of a fluid operated valve (not shown), controlling the admission of fluid under pressure to the head end of the cylinder 19. This will operate the gate 15 to shut off the flow of mineral fines to the mineral fines bin 11, and effect the measuring of fines in said bin by the overflow of fines from said bin along the overflow chute 68.

Referring now in particular to Figures 2, 3 and 4, diagrammatically illustrating the fines measuring system of our invention, a hopper-like storage bin 69 is shown as having a converging lower discharge end having communication at its bottom with a screw conveyor 71 within a housing or tube 73. The screw conveyor 71 carries the fines from the storage bin 69 to a boot tor housing 74 for a bucket elevator 75. The fines carried to the bottom of the boot 74 are conveyed upwardly by the bucket elevator 75 to a position adjacent the top of the plant and are discharged within a chute 76 having communication with the storage or supply chute 12, for supplying mineral fines to the bin 11. A bypass chute 77 is connected from the discharge chute 76 at the upper end of the supply chute 12 and is connected at its opposite end with the overflow chute 68 adjacent the lower end thereof, for returning excess fines to the supply bin 69 after the supply chute 12 has been filled.

The supply chute 12 is of a greater capacity than is necessary for mixture with each batch of asphalt and the conveyor 75 continuously supplying said supply chute with mineral fines assures an ample supply of fines to the measuring bins 11, the volume or weight being maintained constant by flowing the surplus fines through the overflow chute 68, as the sliding gate 15 cuts off the flow of fines from the storage or supply chute 12.

In carrying out the measuring operation of the fines for mixture with the aggregate and asphalt for a batch of asphalt the fines bin 11 may be filled to its top by movement of the gate 15 to an open position to accommodate the mineral fines to flow through the open portion 16 of said gate from the supply chute 12. As the mineral fines flow down the overflow chute 68 the gate 15 may be closed by operation of the switch arm 70, effected by the flow of fines along the chute 68. This effects operation of suitable valve means to supply fluid under pressure to the head end of the cylinder 19. The fines in the bin 11 may then be weighed. Where it is found that the fines in the bin 11 are of insufficient weight for a correct mixture, the movable side wall 36 may be moved toward an open position by operation of the worm 59. The additional compartment space may then be filled with fines by movement of the sliding gate 15 to an open position. If the weight is now sufficient after the excess fines have been run off the top of the bin through the overflow chute 68, the volumetric capacity of the bin 11 will be such as to give a correct weight of fines for mixture with each batch of asphalt without further weighing.

When the measuring bin 11 has been adjusted to the correct volumetric capacity for a given weight of fines and is empty, it is merely necessary to supply fluid under pressure to the piston rod end of the cylinder 19 and move the sliding gate 15 in position to accommodate the flow of fines from the supply chute 12 through the open portion 16 of said sliding gate into the bin 11, until the fines overflow downwardly along the overflow chute 68. The sliding gate 15 may then be closed by the supply of fluid under pressure to the head end of the cylinder 19 effected by the switch arm 70 operated by the flow of fines along the overflow chute 68. The fines may then be discharged for mixture with the aggregate and asphalt by opening of the clam shell discharge gate 61 under control of the fluid pressure cylinders 63, it being understood that opening of the gate 61 opens all of the storage bins of the weigh hopper for the discharge of aggregate with the mineral fines for mixture with the asphalt. During the discharge operation of the mineral fines, the bucket elevator 75 may be continued in operation to elevate the fines conveyed thereto by the screw conveyor 71, and fill the supply chute 12 with a greater volume of fines than is necessary for a next succeeding measuring operation, the excess fines being returned to the storage bin 69 through the return chute 77.

For a next succeeding measuring operation it is merely necessary to open the sliding gate 15 to overfill the measuring bin 11 and then close said gate and accommodate the bin to level off by the flow of the excess fines downwardly through the overfill chute 68 back to the storage bin 69.

The measuring operation may thus be automatically repeated for each batch of asphalt without weighing the fines for each succeeding batch after the mixture of a preceding batch.

While we have herein shown and described one form in which our invention may be embodied, it should be understood that we do not wish to limit ourselves to the particular embodiment shown, and that various modifications of the invention may be effected without departing from the spirit and scope of the novel concepts thereof.

We claim as our invention:

1. In a measuring apparatus particularly adapted to measure mineral fines for mixture with asphalt and aggregate, a measuring bin for fines, a storage bin for fines, an elevator for elevating fines from said storage bin, a supply chute in material receiving relation with respect to said elevator and in material discharge relation with respect to said measuring bin, a sliding gate, power means for operating said gate to control the flow of fines from said supply chute to said measuring bin, a return chute for returning fines discharged by said elevator to said storage bin upon filling of said supply chute with a volume of fines in excess to that required to fill said measuring bin, and an overflow chute leading from said measuring bin from the top thereof for returning mineral fines overflowing said measuring bin to said storage bin.

2. In a measuring apparatus particularly adapted to measure loose material for mixture with asphalt and the like, a weigh hopper having a measuring bin for loose material therein, means supporting said weigh hopper to accommodate the weighing of the loose material in said measuring bin, other means for varying the volume of said measuring bin to contain a predetermined weight of loose material, a storage bin for loose material disposed beneath said weigh hopper, an elevator for elevating loose material from said storage bin to a position above said weigh hopper, a supply chute in material receiving relation with respect to said elevator and in material discharge relation with respect to said measuring bin, a sliding gate, power means for operating said gate to control the flow of loose material from said supply chute to said measuring bin, said supply chute having a greater capacity than the capacity of said measuring bin, a return chute for returning the loose material from an upper region of said supply chute to said storage bin, and an overflow chute leading from said measuring bin from the top thereof for returning loose material overflowing said measuring bin to said storage bin and maintaining a uniform volume of loose material in said measuring bin by overflowing the excess loose material from the top thereof along said overflow chute.

3. A system of measuring and supplying mineral fines for mixture with aggregate and asphalt and the like, comprising the establishing of a continuous source of supply of fines and elevating the fines from storage to supply, measuring the fines from supply by flowing to a measuring bin, levelling the top of the bin by the overflow of fines from the top thereof and blocking the flow of fines to the bin, weighing the fines in the bin and adjusting the volume of the bin to contain a given weight of fines to the top thereof, determined by repeated weighing, adjusting and levelling operations, discharging the given weight of fines from the botom of the bin and thereafter measuring the fines from supply by flowing to the measuring bin in greater volume than the capacity of the bin, blocking the flow of fines to the measuring bin upon the overflow of fines from the top thereof and accommodating the excess fines to flow off the measuring bin to a uniform level in the bin, and collecting and returning the excess fines flowing off the top of the measuring bin to storage and elevating the fines from storage to the supply.

References Cited in the file of this patent

UNITED STATES PATENTS

| | | |
|---|---|---|
| 353,388 | Warner | Nov. 30, 1886 |
| 607,468 | Richards | July 19, 1898 |
| 2,373,831 | Howard | Apr. 17, 1945 |
| 2,549,704 | Noble | Apr. 17, 1951 |
| 2,582,802 | Terrell | Jan. 15, 1952 |